(12) United States Patent
Gauggel et al.

(10) Patent No.: US 11,400,528 B2
(45) Date of Patent: Aug. 2, 2022

(54) END MILL

(71) Applicant: GUEHRING KG, Albstadt (DE)

(72) Inventors: Christian Gauggel, Heinstetten (DE); Marius-Bogdan Bozga, Sucui de Jos (RO)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 16/828,320

(22) Filed: Mar. 24, 2020

(65) Prior Publication Data

US 2020/0338651 A1     Oct. 29, 2020

(30) Foreign Application Priority Data

Mar. 25, 2019   (DE) .................. 10 2019 204063.2

(51) Int. Cl.
    *B23C 5/10*     (2006.01)
(52) U.S. Cl.
    CPC ........ *B23C 5/10* (2013.01); *B23C 2210/0492* (2013.01); *B23C 2210/54* (2013.01); *B23C 2210/64* (2013.01)
(58) Field of Classification Search
    CPC .............. B23C 5/10; B23C 2210/0492; B23C 2210/405; B23C 2210/407; B23C 2210/287; B23C 2226/27
    See application file for complete search history.

(56) References Cited

U.S. PATENT DOCUMENTS

| 3,058,199 | A | * | 10/1962 | Cave | ......................... | B23C 5/10 407/54 |
| 3,913,196 | A | | 10/1975 | Maday | | |
| 4,572,714 | A | * | 2/1986 | Suzuki | ..................... | B23B 51/02 407/53 |
| 4,990,035 | A | * | 2/1991 | Scheuch | ................... | B23C 5/10 407/29.13 |
| 7,090,442 | B2 | * | 8/2006 | Ahrnkiel | ................... | B23C 5/10 407/29.12 |
| 9,174,287 | B2 | | 11/2015 | Shpigelman et al. | | |
| 2013/0294852 | A1 | | 11/2013 | Winebrenner | | |
| 2015/0093204 | A1 | * | 4/2015 | Raynor | ..................... | B23C 5/10 407/32 |

(Continued)

FOREIGN PATENT DOCUMENTS

DE   10 2006 022 572 A1   11/2007
WO       2017/134011 A1    8/2017

*Primary Examiner* — Nicole N Ramos
(74) *Attorney, Agent, or Firm* — Burr & Brown, PLLC

(57) ABSTRACT

An end mill for milling composite materials, for example, fiber-reinforced plastics, having a defined rotating direction, a shank and a cutting part that extends from a shank-side end up to a frontal end and in a front length region adjoining the frontal end of the cutting part, has a plurality of first circumferential cutters running with a positive helix angle, each of which adjoins a first groove running with a positive helix angle, and in a rear length region adjoining the shank-side end of the cutting part, has a plurality of second circumferential cutters running with a negative helix angle, each of which adjoins a second groove running with a negative helix angle. At least a part of the first circumferential cutters in the front length region, and at least a part of the second circumferential cutters in the rear length region, are each divided into cutting segments.

17 Claims, 4 Drawing Sheets

(56) References Cited

U.S. PATENT DOCUMENTS

Figure 1:
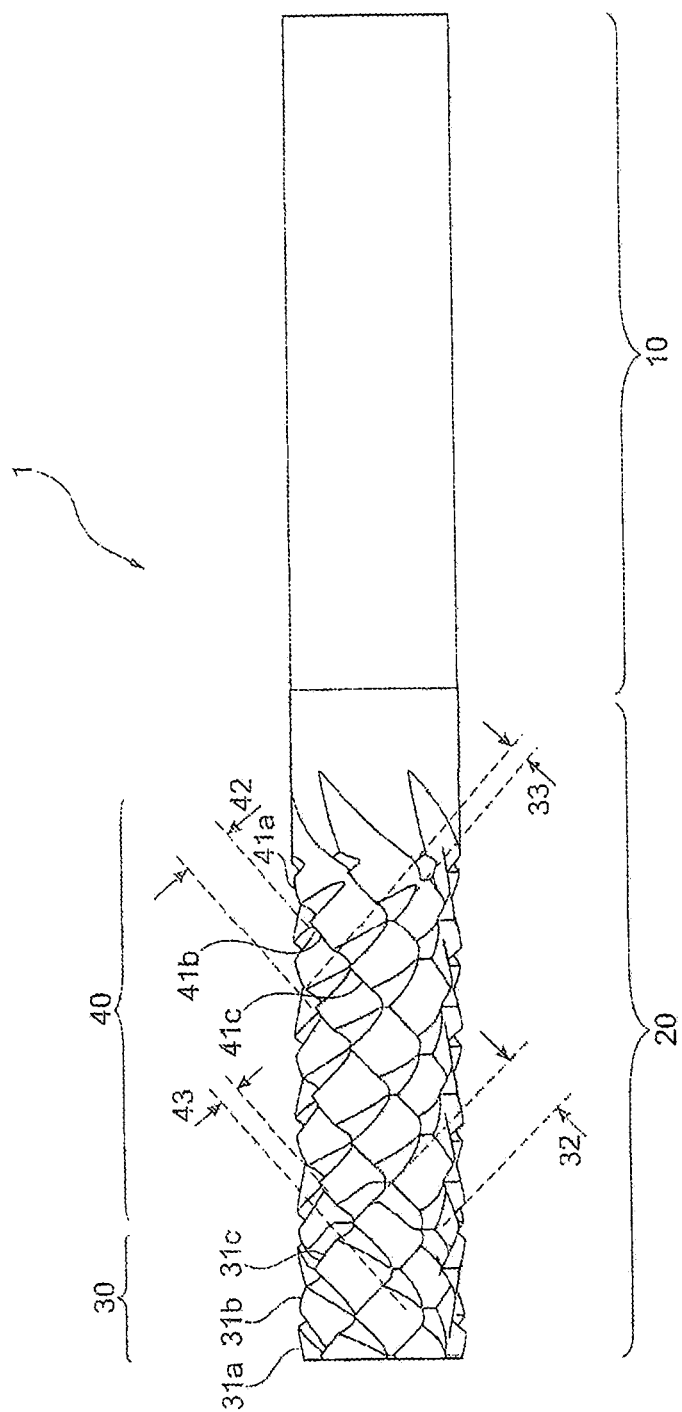

2015/0147127 A1\* 5/2015 Shpigelman .............. B23C 5/10
　　　　　　　　　　　　　　　　　　　　　　407/54
2017/0216936 A1\* 8/2017 Dodds ...................... B23C 5/10

\* cited by examiner

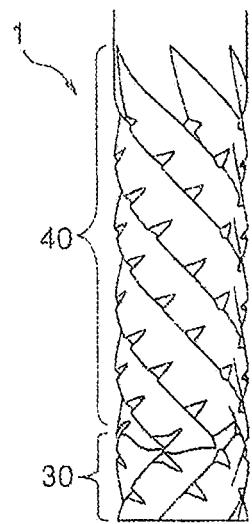 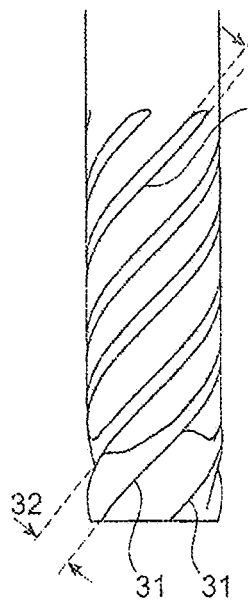 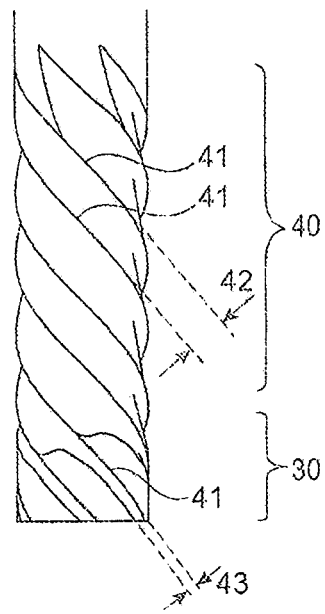
Fig. 3a  Fig. 3b  Fig. 3c
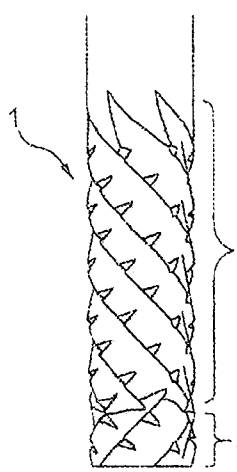 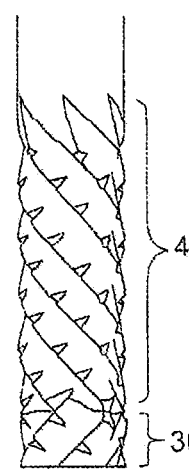 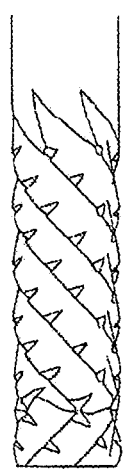 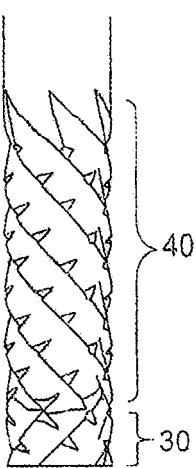
Fig. 4a  Fig. 4b  Fig. 4c  Fig. 4d

END MILL

The invention relates to an end mill for milling composite materials, for example, fiber-reinforced plastics (FRP) such as carbon or glass fiber reinforced plastics (CFRP/GFRP).

Fiber-reinforced plastics are relatively difficult to process due to their multi-phase structure. For example, when milling an FRP board, delamination of fiber composite layers or fiber projections on the two board surfaces can often be observed. Economical processing of modern fiber-reinforced plastics therefore requires an adapted tool design, particularly in series manufacturing, with which delamination or fiber projections on a processed FRP component can be reliably avoided. The tools mentioned having an adapted tool design include, for example, end mills, which are designed as so-called compression cutters, in which a special cutting part design generates opposing axial cutting forces, which lead to compression of a milled FRP material and thereby prevent delamination or fiber projections on the two board surfaces.

For example, DE 102006022572 A1 specifies an end mill having a shank and a cutting part axially connecting to the shank, which cutting part has an even number of, for example, four cutting bars, which are spaced apart from one another in the circumferential direction by grooves and each having a plurality of circumferential cutters having a left or right twist. Taking into account the problems mentioned above, it is proposed that the twist direction of the circumferential cutters of cutting bars immediately following one another in the circumferential direction be reversed from left to right or right to left. During milling of an FRP material, the cutting forces that occur on two cutting bars immediately following one another in the circumferential direction therefore generate opposing axial forces that lead to compression of the FRP material. If an FRP board is milled, fiber composite layers adjacent to the two board surfaces or fibers projecting from the FRP material can be reliably separated.

From WO 2017/134011 A1 or U.S. Pat. No. 9,174,287 B2, for example, the person skilled in the art knows an end mill that has a cutting part connecting to a shank with circumferential cutters that are left and right twisted with respect to the axis of rotation of the end mill and which are divided into segments by crossing left and right twisted grooves. The left and right twisted grooves extend with a constant groove cross section over a cutting zone in the cutting part or from a frontal end up to a shank-side end of the cutting part.

In contrast, U.S. Pat. No. 3,913,196 or US 2013/0294852 A1 shows and describes a right-cutting end mill having a shank and a cutting part connecting to the shank, which cutting part extends from a shank-side end up to a frontal end and, in a front length region that extends from the frontal end up to a transition point in the middle region of the cutting part, a plurality of right-twisted (that is, running with a positive helix angle) first circumferential cutters, each of which adjoins a right-twisted first groove (chip flute), and in a rear length region that extends from the above-mentioned transition point in the middle region of the cutting part to the shank-side end of the cutting part, a plurality of left-twisted (that is, running with a negative helix angle) second circumferential cutters, each of which adjoins a left-twisted second groove (chip flute). Due to the opposite twist direction of the first and second circumferential cutters in the front and rear length region of the cutting part, the cutting forces that occur during milling of an FRP material result in opposing axial forces that cause compression of the FRP material. Due to the division of the first and second circumferential cutters into the front or rear length regions of the cutting part, there is in total a pulling cut in the front length region, through which fiber composite layers or fibers are drawn in the direction of the shank-side end of the cutting part, and in the rear length region, a pushing or pressing cut, through which fiber composite layers or fibers are pushed or pressed in the direction of the frontal end of the cutting part. Due to the opposing axial forces, delamination of fiber composite layers or fiber projections on the two board surfaces of a milled FRP board can be avoided. Since the first and second circumferential cutters are individually ground in the front and rear length regions of the cutting part, however, the design of the cutting part and thus of the end mill overall is relatively difficult and time-consuming.

Starting from an end mill, as is known from U.S. Pat. No. 3,913,196 or US 2013/0294852 A1, the invention is therefore based on the object of creating an end mill designed as a compression cutter which can be produced more quickly and easily.

This object is achieved by an end mill having the features of claim 1. Advantageous or preferred developments are the subject of dependent claims.

An end mill according to the invention for milling composite materials, for example, fiber-reinforced plastics (FRP), has a defined cutting or rotating direction, that is, it is designed to be either right-cutting/right-turning or left-cutting/left-turning. In functional terms, the end mill has a shank that can be clamped in a chuck and a cutting part. The cutting part can axially connect to the shank directly or indirectly via a non-cutting connecting part. The cutting part extends from a shank-side end up to a frontal end and, in an frontal/front length region adjoining its frontal end, has exclusively or at least almost exclusively, a plurality of first circumferential cutters running with a positive helix angle, each adjoining a first groove running with a positive helix angle, and in a shank-side/rear length region adjoining its shank-side end, exclusively or at least almost exclusively, a plurality of second circumferential cutters running with a negative helix angle, each of which adjoins a second groove running with a negative helix angle.

The sign of the helix angle (positive or negative) or the helix direction (positive or negative) of the circumferential cutters and grooves is clearly determined by the cutting direction/rotating direction of the end mill. In a right-cutting/right-turning end mill, right-spiral/right-threaded/right-twisted circumferential cutters/grooves have a positive helix angle and left-spiral/left-threaded/left-twisted circumferential cutters/grooves have a negative helix angle. Conversely, in a left-cutting/left-turning end mill, left-spiral/left-hand/left-threaded/left-twisted circumferential cutters/grooves have a positive helix angle and right-spiral/right-threaded/right-twisted circumferential cutters/grooves have a negative helix angle. A circumferential cutter having a positive helix angle generates an axial cutting force in the direction of the shank-side end of the cutting part and executes a pulling cut, while a circumferential cutter having a negative helix angle generates a cutting force in the direction of the frontal end of the cutting part and executes a pressing cut.

In the manner known to those skilled in the art, each circumferential cutter forms a cutting wedge in cross section, which is clearly defined by a wedge angle, clearance angle and cutting angle. Viewed in the direction of extension, each circumferential cutter extends from a frontal cutting corner to a shank-side cutting corner and corresponds to the cutting line between a tool flank and a cutting face. Each circumferential cutter therefore has a circumferential cutter length that goes beyond a mere cutting corner.

In contrast to the end mills known from the prior art, for example, an end mill from U.S. Pat. No. 3,913,196 or US 2013/0294852 A1 discussed above, in the end mill according to the invention, at least a part of the first circumferential cutters in the front length region are each divided into cutting segments, and at least a part of the second circumferential cutters in the rear length region each divided into cutting segments. The above specification of a circumferential cutter applies analogously to a cutting segment of a circumferential cutter. Each cutting segment of a circumferential cutter therefore extends from a frontal cutting (segment) corner to a shank-side cutting (segment) corner and therefore has a circumferential cutter length that goes beyond a mere cutting (segment) corner. The advantages resulting from these features are discussed below based on two embodiments of the invention.

The characteristic that a plurality of first circumferential cutters running with a positive helix angle is located in the front length region "exclusively or at least almost exclusively" and a plurality of second circumferential cutters running with a negative helix angle is located in the rear length region is to be understood that the presence of a cutting segment corner lying on the outer circumference of the end mill, which arises, for example, when a first groove running with a positive helix angle and a second groove running with a negative helix angle or their associated circumferential cutters cross, is not ruled out, such a cutting segment corner is, however, not regarded as a circumferential cutter having a helix angle.

FIRST EMBODIMENT

In an end mill according to a first embodiment of the invention, the first grooves extend into the rear length region at least up to the shank-side end of the cutting part, the second grooves extend into the front length region at least up to the frontal end of the cutting part, wherein the first grooves in the rear length region are narrower than in the front length region, and the second grooves in the front length region are narrower than in the rear length region. In the end mill according to the first embodiment of the invention, each circumferential cutter is divided into cutting segments. The division according to the invention of the first circumferential cutters running with a positive helix angle in the front length region into cutting segments is achieved in the end mill according to the first embodiment of the invention by the second grooves running with a negative helix angle, which are narrower in the front length region than in the rear length region. Analogously, the division according to the invention of the second circumferential cutters running with a negative helix angle in the rear length region into cutting segments in the end mill according to the first embodiment of the invention is achieved by the first grooves running with a positive helix angle, which are narrower in the rear length region than in the front length region. In other words, the first and second grooves cross both in the front length region and in the rear length region.

In the end mill according to the first embodiment of the invention, it is therefore provided that the first grooves running with a positive helix angle extend in the direction from the frontal end to the shank-side end of the cutting part towards the front length region of the cutting part with a respective adjacent first circumferential cutter reduced groove width by the rear length region of the cutting part, in which the plurality of second circumferential cutters running with a negative helix angle is formed almost exclusively, extend at least up to the shank-side end of the cutting part. Furthermore, the second grooves, which run with a negative helix angle, extend in the direction from the shank-side end to the frontal end of the cutting part towards the rear length region of the cutting part with a groove width which is reduced toward the respectively adjacent second circumferential cutter through the front length region of the cutting part, in which almost exclusively the plurality of first circumferential cutters running with a positive helix angle is formed up to the frontal end of the cutting part.

In other words, the first grooves running with a positive helix angle widen in the cutting direction/rotating direction from the shank-side end to the frontal end of the cutting part at the transition from the rear length region to the front length region of the cutting part so that no second circumferential cutters running with a negative helix angle are formed in the front length region. Analogously, the second grooves running with a negative helix angle widen in a direction from the frontal end to the shank-side end of the cutting part at the transition from the front length region to the rear length region of the cutting part in the cutting direction/rotating direction to such an extent that no first circumferential cutters running with a positive helix angle are formed in the rear length region.

An almost exclusively pulling cut is achieved in the front length region of the cutting part and an almost exclusively pushing or pressing cut is achieved in the rear length region of the cutting part through this design. Opposing axial forces are obtained when milling an FRP board, which forces cause a compression of the FRP material and prevent a delamination and fiber projections on the two board surfaces of the FRP board.

As described above, the narrowing or reduction of the groove widths of the first grooves in the rear length region further has the result that the second circumferential cutters in the rear length region crossed by the first grooves are divided into cutting segments running with a negative helix angle.

Analogously, the narrowing or reduction of the groove widths of the second grooves in the front length region has the result that the first circumferential cutters in the front length region crossed by the narrower second grooves are divided into cutting segments running with a positive helix angle. The end mill according to the first embodiment of the invention is therefore characterized, in addition to the effects of a compression cutter as initially described, such as are also described in U.S. Pat. No. 3,913,196 or US 2013/0294852 A1 discussed above, in that the first circumferential cutters present in the front length region and the second circumferential cutters present in the rear length region each have a chip splitter profile. In the front length region, the first grooves running with a positive helix angle act as chip-removing grooves due to the larger groove widths. In the rear length region, the first grooves running with a positive helix angle act as chip splitter grooves or chip breakers due to the reduced groove widths. In the rear length region, the second grooves running with a negative helix angle act as chip-removing grooves due to the larger groove widths. In the front length region, the second grooves running with a negative helix angle act as chip splitter grooves or chip breakers due to the reduced groove widths.

Due to the extension of the first grooves into the rear length region at least up to the shank-side end of the cutting part and the second grooves into the front length region at least up to the frontal end of the cutting part and the associated division of the circumferential cutters into cutting segments according to the invention, the cutting part is also easier and more economical to produce than, for example, the end mill known from U.S. Pat. No. 3,913,196 or US 2013/0294852 A1 discussed above. Such a design offers the advantage that the first and second grooves delimiting the first and second circumferential cutters successively with the aid of a grinding wheel, which has a grinding wheel profile corresponding to a cross-sectional profile of the first and second grooves and having a twist corresponding to the respective groove and is guided in one go over the cutting part over the length the corresponding groove, can be ground into the cutting part. By changing the attack angle and/or the plunging depth of the grinding wheel with respect to the axis of rotation of the end mill at the transition from the front length region to the rear length region or vice versa, the groove width of a groove to be ground in each case can be reduced or enlarged. As an alternative to this, the groove width of a groove to be ground in each case can be increased by grinding in a further parallel offset groove into the front length region or rear length region. Corresponding methods are claimed in the form of independent claims 13 and 14.

The groove width of every second groove in the front length region of the cutting part can be, for example, 0.1 to 0.8 times, preferably 0.1 to 0.5 times, the groove width of every first groove in the first embodiment of the invention in the front length region. Analogously, the groove width of every first groove in the rear length region can be, for example, 0.1 to 0.8 times, preferably 0.1 to 0.5 times, the groove width of every second groove in the rear length region.

In the interest of forming the cutting part as simply and economically as possible, preferably by grinding, the groove width of every first groove in the front length region can be equal to the groove width of every second groove in the rear length region and the groove width of every first groove in the rear length region can be equal to the groove width of every second groove in the front length region.

If the cutting part is formed by grinding, the first and second grooves can be narrowed or widened, for example, by changing the radial plunging depth (that is, the radial distance from the axis of rotation of the end mill) of a grinding wheel used for the grinding wheel, which has a tapered, for example, round, grinding wheel profile corresponding to the groove cross section of the first and second grooves. A narrowing of the first and second grooves can be thus achieved by reducing the radial plunging depth of the grinding wheel, a widening of the first and second grooves can be achieved by increasing the radial plunging depth of the grinding wheel. With a cutting part formed in this way, a change in the groove widths (narrowing or widening) of the first and second grooves is accompanied by a change in the groove depths (reducing the depth, increasing the depth) of the first and second grooves. The first grooves running with a positive helix angle can therefore have a greater groove width and a greater groove depth in the front length region of the cutting part than in the rear length region. Analogously, the second grooves running with a negative helix angle can have a greater groove width and a greater groove depth in the rear length region of the cutting part than in the front length region.

SECOND EMBODIMENT

The division of at least a part of the first and second circumferential cutters into cutting segments according to the invention can be achieved according to a second embodiment of the invention as an alternative to the first embodiment of the invention, in which the first and second grooves have variable groove widths over the length of the cutting part, that viewed in the circumferential direction of the end mill, only every second first groove extends into the rear length region up to the shank-side end of the cutting part and the remaining first grooves extend up to the rear length region, viewed in the circumferential direction of the end mill, only every second second groove extends into the front length region up to the frontal end of the cutting part, and the remaining second grooves extend up to the front length region, wherein the groove width of every first groove is constant over its respective length, and the groove width of every second groove is constant over its respective length.

The end mill according to the second embodiment of the invention offers the advantage over the end mills known from the prior art in that at least those first grooves that extend up to the shaft-side end of the cutting part and at least a part of the second circumferential cutters in the rear length region divide into cutting segments, and those second grooves that extend up to the frontal end of the cutting part and at least a part of the first circumferential cutters divide into cutting segments, can be formed in one go during grinding with a grinding wheel.

Furthermore, in the end mill according to the second embodiment of the invention, the groove depths of the first and second grooves can also be constant over their respective lengths, so that the end mill can be manufactured as simply and quickly as possible, since neither the attack angle nor the plunging depth of the grinding wheel needs to be changed when grinding the respective grooves with the aid of a grinding wheel.

In the end mill according to the invention, the length of the front length region can be 0.5 to 4 times, preferably 1 to 2.5 times, the diameter of the end mill.

A cutting face and tool flank adjoin each circumferential cutter in the usual way. The chips running off the cutting face of a first or second circumferential cutter are removed via the respectively adjoining first or second groove. Every first groove in the front length region or every second groove in the rear length region therefore has the function of a chip flute. In the interest of forming the cutting part as simply and economically as possible, the first and/or second grooves in the front or rear length region are each designed such that they extend up to a respective closest circumferential cutter as seen in the cutting or rotating direction of the end mill. Each first groove can therefore be designed in the front length region in such a way that it forms the cutting face of the respectively adjacent circumferential cutter and the tool flank of the circumferential cutter closest in the cutting or rotating direction with the same helix angle. Analogously, every second groove in the rear length region can be designed such that it forms the cutting face of the respectively adjacent circumferential cutter and the tool flank of a respective circumferential cutter lying ahead in the rotating direction. The cutting face and tool flank of two circumferential cutters that follow one another immediately in the cutting or rotating direction can thus be produced by a groove.

In the interest of forming the cutting part as simply and economically as possible, the helix angles of the first and second circumferential cutters are preferably of the same magnitude.

Furthermore, the first and second circumferential cutters are preferably each provided in the same number and distributed equidistantly about an axis of rotation of the end mill.

The cutting part of an end mill according to the invention can additionally be designed frontal cutting. In this regard, the first grooves running with a positive helix angle can extend into the frontal face of the cutting part and form frontal cutters.

Figure 2:
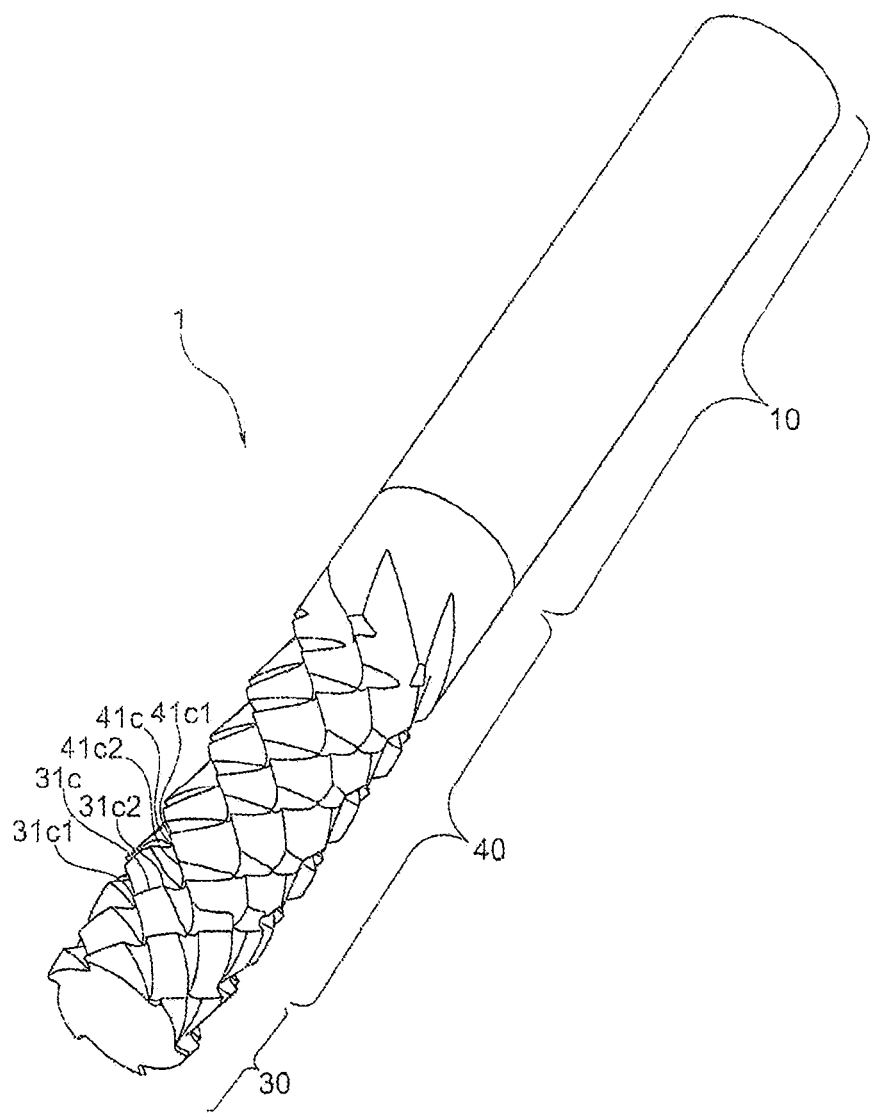
Figures 5A, 5B, 5C:
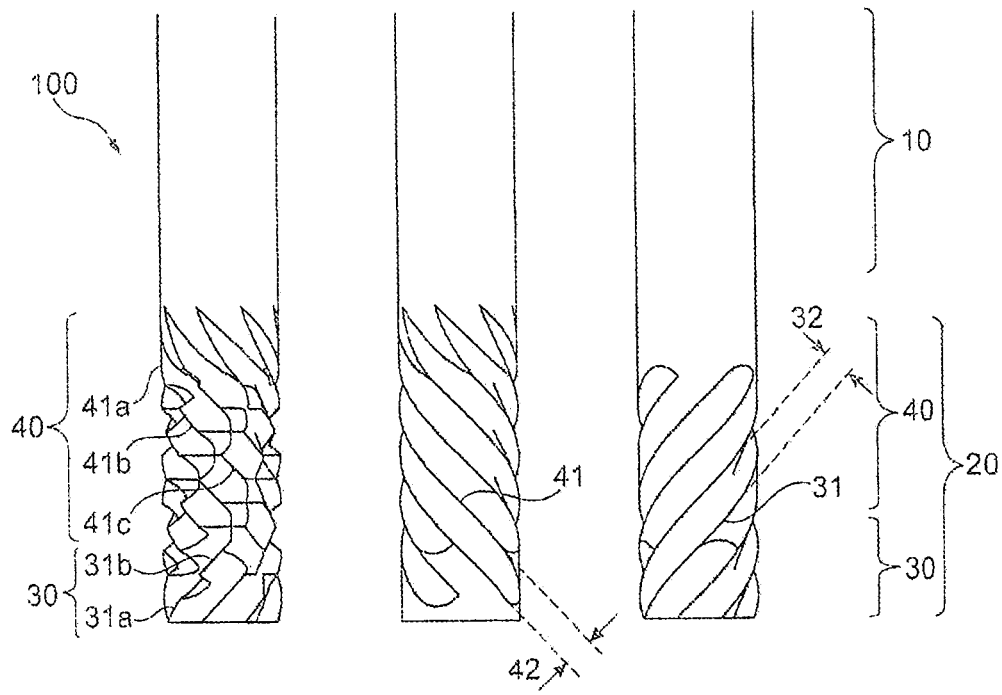
Figures 6A, 6B, 6C, 6D:
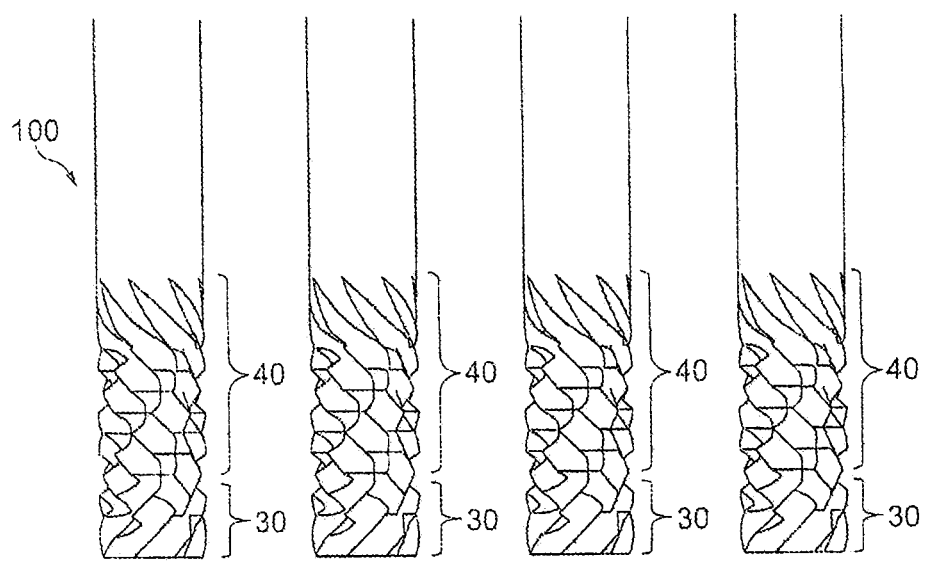

The above-discussed and further features of the end mill according to the invention are explained in more detail in the following with reference to the accompanying drawings using the example of two embodiments. The drawings show FIG. 1 a side view of an end mill according to the invention according to a first embodiment;

FIG. 2 a perspective view of the end mill of FIG. 1;

FIG. 3*a* a further side view of an end mill according to the invention according to the first embodiment;

FIG. 3*b* a side view of the end mill from FIG. 3*a*, wherein only first grooves having a positive helix angle are shown;

FIG. 3*c* a side view of the end mill from FIG. 3*a*, wherein only second grooves having a negative helix angle are shown;

FIGS. 4*a* to 4*d* side views of the end mill according to the first embodiment rotated by 90° in each case;

FIG. 5*a* a side view of an end mill according to the invention according to a second embodiment;

FIG. 5*b* a side view of the end mill from FIG. 5*a*, wherein only second grooves having a negative helix angle are shown;

FIG. 5*c* a side view of the end mill from FIG. 5*a*, wherein only first grooves having a positive helix angle are shown; and FIGS. 6*a* to 6*d* side views of the end mill according to the second embodiment rotated by 90° in each case.

FIRST EMBODIMENT

FIGS. 1 to 4*d* show an end mill 1 according to the invention according to a first embodiment of the invention. Both the end mill 1 according to the first embodiment and a later described end mill 100 according to a second embodiment are designed to be right-cutting/right-turning. It should be noted that for right-cutting/right-turning end mills, right-spiral/right-threaded/right-twisted circumferential cutters/grooves have a positive helix angle and left-spiral/left-threaded/left-twisted circumferential cutters/grooves have a negative helix angle.

Functionally, the end mill 1 according to the first embodiment of the invention has a shank 10 that can be clamped in a chuck (not shown) and a cutting part 20. The cutting part 20 extends from a shank-side end up to a frontal end and, in a frontal/front length region 30 adjoining its frontal end (left in FIG. 1), almost exclusively has a plurality, six in the embodiment shown, of first circumferential cutters 31 running with a positive helix angle. The first circumferential cutters 31 in the front length region 30 are each divided into cutting segments. Reference is made in FIGS. 1 to 4*d* by way of example to one of the six first circumferential cutters 31, wherein FIG. 1 shows that the first circumferential cutter 31 (see FIG. 3*b*) is divided into a plurality of cutting segments 31*a* to 31*c* (by way of example). The circumferential cutter 31 formed by the cutting segments 31*a* to 31*c* adjoins a first groove 32 running with a positive helix angle.

In a shank-side/rear length region 40 adjoining its shank-side end, the cutting part 1 has almost exclusively a plurality, six in the embodiment shown, of second circumferential cutters 41 running with a negative helix angle. The second circumferential cutters 41 in the rear length region 40 are each divided into cutting segments. Reference is made in FIGS. 1 to 4*d* by way of example to one of the six second circumferential cutters 41, wherein FIG. 1 shows that the second circumferential cutter 41 (see FIG. 3*c*) is divided into a plurality of cutting segments 41*a* up to 41*c* (by way of example). The circumferential cutter 41 formed by the cutting segments 41*a* to 41*c* adjoins a second groove 42 running with a negative helix angle. In the end mill 1 according to the first embodiment of the invention, each of the circumferential cutters 31, 41 is divided into cutting segments. The amount of the negative helix angle of the second circumferential cutters 41 corresponds to the amount of the positive helix angle of the first circumferential cutters 31.

A cutting face and tool flank adjoin each circumferential cutter 31, 41 in the usual way. The chips running off on the cutting face of a first circumferential cutter 31 or second circumferential cutter 41 are removed via the respectively adjacent first groove 32 and second groove 42. Every first groove 32 in the front length region 30 or every second groove 42 in the rear length region 40 therefore has the function of a chip flute. In the interest of forming the cutting part as simply and economically as possible, the first grooves 32 in the front length region 30 and second grooves 42 in the rear length region 40 are each designed such that, viewed in the cutting or rotating direction of the end mill 1, they extend up to a respective closest circumferential cutter 31 or 41. Every first groove 32 is therefore designed in the front length region 30 such that it forms the cutting face of the respectively adjacent circumferential cutter 31 and the tool flank of the circumferential cutter 31 closest in the cutting or rotating direction with the same helix angle (see FIG. 3*b*). Analogously to this, every second groove 42 is designed in the rear length region in such a way that it forms the cutting face of the respectively adjacent circumferential cutter 41 and the tool flank of a circumferential cutter 41 lying ahead in the rotating direction. The cutting face and tool flank of two circumferential cutters 31, 41 that follow one another immediately in the cutting or rotating direction can thus be produced by a groove.

In the end mill 1 according to the first embodiment of the invention, the first grooves 32 extend into the rear length region 40 up to the shank-side end of the cutting part 20 (see FIG. 3*b*). Furthermore, the second grooves 42 extend into the front length region 30 up to the frontal end of the cutting part 20 (see FIG. 3*c*). The first grooves 32 here, which are identified in the rear length region 40 by the reference symbol 33, are narrower in the rear length region 40 than in the front length region 30. Analogously to this, the second grooves 42, which are identified by the reference symbol 43 in the front length region, are narrower in the front length region 30 than in the rear length region 40. The division of the first circumferential cutters 31 running with a positive helix angle in the front length region into cutting segments 31*a* to 31*c* is achieved in the end mill 1 according to the first embodiment of the invention by the second grooves 43 running with a negative helix angle and which are narrower in the front length region 30 than in the rear length region 40. Analogously to this, the division of the second circumferential cutters 41 running with a negative helix angle in the rear length region 40 into cutting segments 41*a* to 41*c* in the end mill 1 according to the first embodiment of the invention is achieved by the first grooves 33 running with a positive helix angle, which are narrower in the front length region 30 than in the rear length region 40. In other words, the first grooves 32 and 33 and the second grooves 42 and 43 cross both in the front length region 30 and in the rear length region 40.

The crossing or overlapping of the first grooves 32 and and the associated circumferential cutters 31 and the second grooves 42 and 43 and the associated circumferential cutters 41 is shown in FIGS. 3a to 3c. FIG. 3b shows the course of the first grooves 32 and 33 running with a positive helix angle and which are wider in the front length region 30 than in the rear length region 40, and the associated first circumferential cutters 31. Analogously to this, FIG. 3c shows the course of the second grooves 42 and 43 running with a negative helix angle and which are wider in the rear length region than in the front length region 30, and the associated second circumferential cutters 41. When the course of the grooves of FIGS. 3b and 3c are superimposed, the result is the segmented cutting profile shown in FIG. 3a and FIGS. 4a to 4d rotated by 90°.

In other words, the first grooves 31 running with a positive helix angle widen in the direction from the shank-side end to the frontal end of the cutting part 20 at the transition from the rear length region 40 to the front length region 30 of the cutting part 20 in the cutting direction/rotating direction to such an extent that in the front length region 30, no second circumferential cutters 41 running with a negative helix angle are formed. Analogously to this, the second grooves 41 running with a negative helix angle widen in a direction from the frontal end to the shank-side end of the cutting part 20 at the transition from the front length region 30 to the rear length region 40 of the cutting part 20 in the cutting direction/rotating direction to such an extent that no first circumferential cutters 31 running with a positive helix angle are formed in the rear length region 40. The first circumferential cutters 31 or their cutting segments 31a to 31c with a positive helix angle each generate an axial cutting force in the direction of the shank-side end of the cutting part 20 and execute a pulling cut, while the second circumferential cutters 41 or their cutting segments 41a to 41c with a negative helix angle generate a cutting force in the direction of the frontal end of the cutting part 20 and each execute a pressing cut. Both a pressing and a pulling cut is executed in a transition or overlap region, not shown in detail in the figures, lying between the front length region 30 and the rear length region 40.

As shown, for example, in the perspective view of the end mill 1 in FIG. 2, after the crossing or overlapping of the first grooves 32 or 33 and the second grooves 42 or 43, cutting segment corners lying on the outer circumference of the end mill 1 remain, which corners form the ends of each cutting segment lying in the circumferential direction of rotation of the end mill 1. FIG. 2 shows, by way of example, the cutting segment corners 31c1 and 31c2 of the cutting segment 31c of the first circumferential cutter 31 running with a positive helix angle and the cutting segment corners 41c1 and 41c2 of the cutting segment 41c of the second circumferential cutter 41 running with a negative helix angle. However, the cutting segment corners 31c1 and 31c2 of the cutting segment 31c in the front length region 30 cannot be regarded as a circumferential cutter having a helix angle, which is why all cutting segments 31a to 31c running with a positive helix angle of the first circumferential cutters 31 in the front length region 30 execute an almost exclusively pulling cut and all cutting segments 41a to 41c of the second circumferential cutting edges running with a negative helix angle execute an almost exclusively pushing or pressing cut in the rear length region. Opposing axial forces are obtained when milling an FRP board, which forces cause a compression of the FRP material and prevent a delamination and fiber projections on the two board surfaces of the FRP board.

The first circumferential cutters 31 present in the front length region 30 and the second circumferential cutters 41 present in the rear length region 40 therefore each have a chip splitter profile. In the front length region 30, the first grooves 32 running with a positive helix angle act as chip-removing grooves due to the larger groove widths. In the rear length region 40, the first grooves 33 running with a positive helix angle act as chip splitter grooves or chip breakers due to the reduced groove widths. In the rear length region 40, the second grooves 42 running with a negative helix angle function as chip-removing grooves due to the larger groove widths. In the front length region 30, the second grooves 43 running with a negative helix angle act as chip splitter grooves or chip breakers due to the reduced groove widths.

In the end mill 1 according to the first embodiment of the invention, the groove width of the first grooves 32 in the front length region 30 of the cutting part 20 corresponds to the groove width of the second grooves 42 in the rear length region 40 of the cutting part 20.

SECOND EMBODIMENT

FIGS. 5a to 6d show an end mill 100 according to the invention according to a second embodiment of the invention. The basic structure of the end mill 100 according to the second embodiment of the invention corresponds to the structure of the end mill 1, which is why only the differences will be discussed in the following. In contrast to the end mill 1 of the first embodiment of the invention, the division of at least a part of the first circumferential cutters 31 and the second circumferential cutters 41 into cutting segments according to a second embodiment of the invention is achieved in that, viewed in the circumferential direction of the end mill 100, only every second first groove 31 extends into the rear length region 40 up to the shank-side end of the cutting part 20 and the remaining first grooves 32 only extend up to the rear length region 40 (see FIG. 5c), viewed in the circumferential direction of the end mill 100, only every second second groove 42 extends into the front length region 30 up to the frontal end of the cutting part 20, and the remaining second grooves 42 only extend up to the front length region 30 (see FIG. 5b), wherein the groove width of each first groove 32 is constant over its respective length, and the groove width of every second groove 42 is constant over its respective length.

In the end mill 100 according to the second embodiment of the invention, the groove depths of the first grooves 32 and the second grooves 42 are also constant over their respective lengths, so that the end mill 100 can be manufactured as simply and quickly as possible, since when grinding the respective grooves 32, 42 with the aid of a grinding wheel, neither the attack angle nor the plunging depth of the grinding wheel need to be changed.

The invention claimed is:

1. An end mill for milling composite materials, having a defined rotating direction, a shank and a cutting part, the cutting part extending from a shank-side end up to a frontal end, the cutting part comprising a front length region and a rear length region, the front length region extending from the frontal end toward the shank-side end, the rear length region extending from the shank-side end toward the frontal end, wherein:

the front length region has a plurality of first circumferential cutters running with a positive helix angle, each of which adjoins at least one first groove, each first groove running with a positive helix angle, the rear length region has a plurality of second circumferential cutters running with a negative helix angle, each of which adjoins at least one second groove, each second groove running with a negative helix angle, at least a part of the first circumferential cutters in the front length region are each divided into cutting segments, at least a part of the second circumferential cutters in the rear length region are each divided into cutting segments, each of the at least one first groove extends into the rear length region at least up to the shank-side end of the cutting part, each of the at least one second groove extends into the front length region at least up to the frontal end of the cutting part, each of the at least one first groove is wider and/or deeper in the front length region than in the rear length region, and each of the at least one second groove is wider and/or deeper in the rear length region than in the front length region.

2. The end mill according to claim 1, wherein each of the at least one first groove is narrower in the rear length region than in the front length region, and each of the at least one second groove is narrower in the front length region than in the rear length region.

3. The end mill according to claim 2, wherein a groove width of every second groove in the front length region is 0.1 to 0.8 times a groove width of every first groove in the front length region, and a groove width of every first groove in the rear length region is 0.1 to 0.8 times a groove width of every second groove in the rear length region.

4. The end mill according to claim 1, wherein a groove width of every first groove in the front length region is equal to a groove width of every second groove in the rear length region, and a groove width of every first groove in the rear length region is equal to a groove width of every second groove in the front length region.

5. The end mill according to claim 1, wherein each of the at least one first groove is deeper in the front length region than in the rear length region, and each of the at least one second groove is deeper in the rear length region than in the front length region.

6. The end mill according to claim 2, wherein a groove width of every second groove in the front length region is 0.1 to 0.5 times a groove width of every first groove in the front length region, and a groove width of every first groove in the rear length region is 0.1 to 0.5 times a groove width of every second groove in the rear length region.

7. The end mill according to claim 1, wherein the front length region is shorter than the rear length region.

8. The end mill according to claim 1, wherein a length of the front length region is 0.5 to 4 times a diameter of the end mill.

9. The end mill according to claim 1, wherein every first groove in the front length region is designed such that it forms a cutting face of the respectively adjacent circumferential cutter and a tool flank of the respective forerunning circumferential cutter, and every second groove in the rear length region is designed such that it forms a cutting face of the respectively adjacent circumferential cutter and a tool flank of a circumferential cutter lying ahead in the rotating direction.

10. The end mill according to claim 1, wherein the helix angles of the first and second circumferential cutters are of equal magnitude.

11. The end mill according to claim 1, wherein the first and second circumferential cutters are each distributed equidistantly about an axis of rotation of the end mill.

12. The end mill according to claim 1, wherein the number of first circumferential cutters is equal to the number of second circumferential cutters.

13. The end mill according to claim 1, wherein a length of the front length region is 1 to 2.5 times a diameter of the end mill.

14. The end mill according to claim 1, wherein the end mill comprises a plurality of first grooves and a plurality of second grooves.

15. The end mill according to claim 14, wherein when viewed in the circumferential direction of the end mill, only every second first groove extends into the rear length region up to the shank-side end of the cutting part and the remaining first grooves extend up to the rear length region, when viewed in the circumferential direction of the end mill, only every second second groove extends into the front length region up to the frontal end of the cutting part and the remaining second grooves extend up to the front length region, wherein a groove width of every first groove is constant over its respective length, and a groove width of every second groove is constant over its respective length.

16. A method for grinding an end mill as recited in claim 14, wherein the first grooves and second grooves each with the aid of a grinding wheel, which has a grinding wheel profile corresponding to a groove cross section of the first groove and second groove and is guided in one go over the cutting part over the length the corresponding groove, having a twist about an axis of rotation of the end mill, are ground sequentially into the cutting part, and a groove width of each groove to be ground is increased by grinding in a further parallel offset groove into the front length region or rear length region.

17. A method for grinding an end mill as recited in claim 1, wherein the first grooves and second grooves each with the aid of a grinding wheel, which has a grinding wheel profile corresponding to a groove cross section of the first groove and second groove and is guided in one go over the cutting part over the length the corresponding groove, having a twist about an axis of rotation of the end mill, are ground sequentially into the cutting part, and a groove width of a groove to be ground in each case is reduced or enlarged by changing an attack angle and/or a plunging depth of the grinding wheel with respect to the axis of rotation at a transition from a front length region to a rear length region or from the rear length region to the front length region.

* * * * *